United States Patent
French

(10) Patent No.: US 11,772,435 B2
(45) Date of Patent: Oct. 3, 2023

(54) VALVE ASSEMBLY FOR TIRES

(71) Applicants: TEDDY FORMOSA CO., LTD., Taichung (TW); BEAR CORPORATION, Norwalk, CA (US)

(72) Inventor: George French, Sheffield (GB)

(73) Assignees: TEDDY FORMOSA CO., LTD., Taichung (TW); BEAR CORPORATION, Norwalk, CA (US)

( * ) Notice: Subject to any disclaimer, the term of this patent is extended or adjusted under 35 U.S.C. 154(b) by 422 days.

(21) Appl. No.: 17/039,211

(22) Filed: Sep. 30, 2020

(65) Prior Publication Data

US 2022/0097467 A1  Mar. 31, 2022

(51) Int. Cl.
 *B60C 5/22* (2006.01)
 *B60C 29/02* (2006.01)
 *B60C 29/00* (2006.01)
 *B60C 29/04* (2006.01)

(52) U.S. Cl.
 CPC .............. *B60C 29/005* (2013.01); *B60C 5/22* (2013.01); *B60C 29/007* (2013.01); *B60C 29/02* (2013.01); *B60C 29/04* (2013.01)

(58) Field of Classification Search
 CPC .. B60C 5/20; B60C 5/22; B60C 29/00; B60C 29/02; B60C 29/04; B60C 29/007
 See application file for complete search history.

(56) References Cited

U.S. PATENT DOCUMENTS

| | | | | |
|---|---|---|---|---|
| 2,039,343 A | * | 5/1936 | Prokul | B60C 5/20 152/429 |
| 2,560,609 A | * | 7/1951 | Van | B60C 5/20 152/339.1 |
| 3,848,652 A | * | 11/1974 | Hughes | B60C 29/00 152/415 |
| 4,765,358 A | * | 8/1988 | Cady | B60C 29/007 152/427 |
| 5,538,061 A | | 7/1996 | Blair | |
| 8,875,761 B2 | | 11/2014 | French | |

* cited by examiner

*Primary Examiner* — Justin R Fischer
(74) *Attorney, Agent, or Firm* — Birch, Stewart, Kolasch & Birch, LLP

(57) ABSTRACT

A valve assembly is configured to secure on a hole of a rim on which a tire having at least two air chambers is mounted. The valve assembly includes a main body, a securing means, at least two valve bodies and at least two valves. The main body includes at least two transfer air passage respectively connected to each of the air chambers. The securing means is configured to secure the main body and also the at least two valve bodies on the rim. The at least two valve bodies are respectively disposed on the main body and each of the at least two valve bodies has an inlet air passage connected to one of the transfer air passages of the main body. The at least two valves are respectively attached to each of the at least two valve bodies.

26 Claims, 11 Drawing Sheets

VALVE ASSEMBLY FOR TIRES

BACKGROUND OF THE INVENTION

1. Field of the Invention

The present invention relates to a valve assembly for tires, in particular, a bicycle tire. Furthermore, the present invention relates to a valve assembly for a tire having at least two air chambers and being mounted on a rim with a single hole.

2. Description of the Related Art

U.S. Pat. No. 5,538,061 disclosed a dual chamber tire assembly having an outer tire with an inner tire disposed within the outer tire forming an outer chamber and inner chamber. The dual chamber tire assembly further included a one way valve means extending through the inner tire to enable air flow from the outer chamber to the inner chamber, a first inflation and deflation valve means extending through the outer tire into the outer chamber, and a second inflation and deflation valve means extended through extends through the outer tire and the inner tire into inner chamber. In this tire assembly, the operator can directly and independently inflate, gauge and deflate outer chamber to a correct air pressure and directly and independently inflate inner chamber to a higher air pressure than outer chamber to verify that inner chamber is not leaking air pressure and the inner tire will support the vehicle load when outer tire is punctured or has a blow-out, thereby reducing the operator's potential danger and reducing a tire manufacturer's potential liability. However, as shown in FIG. 1 of the patent, mounting the valves into the sidewall of the tire is difficult in production and requires the valves to withstand the flexure of the tire carcass and also leaves the valves vulnerable to damage from road debris, curbs, etc.

U.S. Pat. No. 8,875,761 disclosed a system of securing a pneumatic tire to a rim that is available to improve the aforementioned dual chamber tire assembly. The system includes an inner tube mounted to a standard rim comprising a channel including lateral flanges to receive the inner tube and a standard tire seated between the inner tube and the lateral flanges of the channel. The inner tube is an encasing to hold air. The tire and the rim enclose the inner tube in a volume defined between the channel and an inner surface of the tire. An inflation valve is coupled to the encasing to allow inflation of the encasing. A pressure valve is coupled to the encasing to be biased closed and allow air to leave the encasing when a differential pressure between inside of the encasing and outside of the encasing reaches a first threshold pressure level. The disadvantages and problems associated with conventional inner tube and tubeless tire systems are reduced or eliminated by such a system. However, the main drawback of this system is that the pressure of the encasing of the inner tube and the pressure of the volume of the tire depend on each other, and the process of adding air to the tire is difficult to reverse, requiring the complete deflation of both volumes to reduce the pressure by even a small amount. As a result, it is difficult for the operator to precisely control tire pressures. Therefore, it would be desirable to provide a valve assembly which improves on the known designs by resolving the above-described deficiencies.

SUMMARY OF THE INVENTION

Disclosed herein is a valve assembly for a tire having at least two air chambers and being mounted on a rim with a single existing hole on which the valve assembly is secured. According to an aspect of the present invention, the valve assembly comprises a main body, a securing means, at least two valve bodies and at least two valves. The main body includes at least two transfer air passage respectively connected to each of the air chambers. The securing means is configured to secure the main body and also the at least two valve bodies on the rim. The at least two valve bodies are respectively disposed on the main body and each of the at least two valve bodies has an inlet air passage connected to one of the transfer air passages of the main body. The at least two valves are respectively attached to each of the at least two valve bodies.

In some embodiments, the main body has an externally-threaded upper portion, a middle portion and an externally-threaded lower portion. The at least two valve bodies includes a primary valve body having a primary inlet air passage and a secondary valve body having a secondary inlet air passage. The primary valve body is disposed on the middle portion of the main body in such a way that the primary inlet air passage is connected to a first one of the transfer air passages. The secondary valve body is disposed on the externally-threaded upper portion of the main body in such a way that the secondary inlet air passage is connected to a second one of the transfer air passages. Preferably, the main body and the secondary valve body are formed as a single piece. The securing means has a male barbed end fitting threadingly engaged with the externally-threaded lower portion, a female fitting disposed on an inner wall of the tire such that the male barbed end fitting is mated to the female fitting to fix the main body on the tire, and a retaining nut threadingly engaging the externally-threaded upper portion of the main body to secure the main body and the at least two valve bodies on the rim.

There is an option that the middle portion of the main body has a first vent conduit and an inner tube with a through bore being arranged in the first vent conduit in such a way that a space is defined between the inside wall of the middle portion and the outside wall of the inner tube to serve as the first transfer air passage, and the through bore of the inner tube is served as the second transfer air passage.

There is another option that the primary valve body includes a collar portion fitted to the middle portion of the main body and a side branch extending outwardly and upwardly from the collar portion to which the primary valve is attached. The valve assembly further includes an upper end cap disposed on an upper end of the collar portion of the primary valve body, a lower end cap disposed on a lower end of the collar portion of the primary valve body, and a tight-fitting inner spacer disposed between an inner surface of the collar portion of the primary valve body and an outer surface of the middle portion of the main body.

In a particular embodiment, the valve assembly comprises a base body including a primary portion having a primary inlet air passage to serve as the primary valve body, a secondary portion having a secondary inlet air passage to serve as the secondary valve body, and a connecting portion connecting the primary portion and the secondary portion. The connecting portion of the base body has a through bore for being passed through by the main body in such a way that the middle portion thereof is housed in the through bore and the upper externally-threaded portion of the main body extends outwardly from the through bore.

In most embodiments, the valve assembly further includes an outer seal and the main body has a first annular shoulder such that when the main body extends outwardly through the rim, the outer seal sits on the first annular shoulder and seals against an inner wall of the rim to prevent air from escaping around the main body. In addition, the first annular shoulder of the main body can serve to provide a stop for the main body inside the rim.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
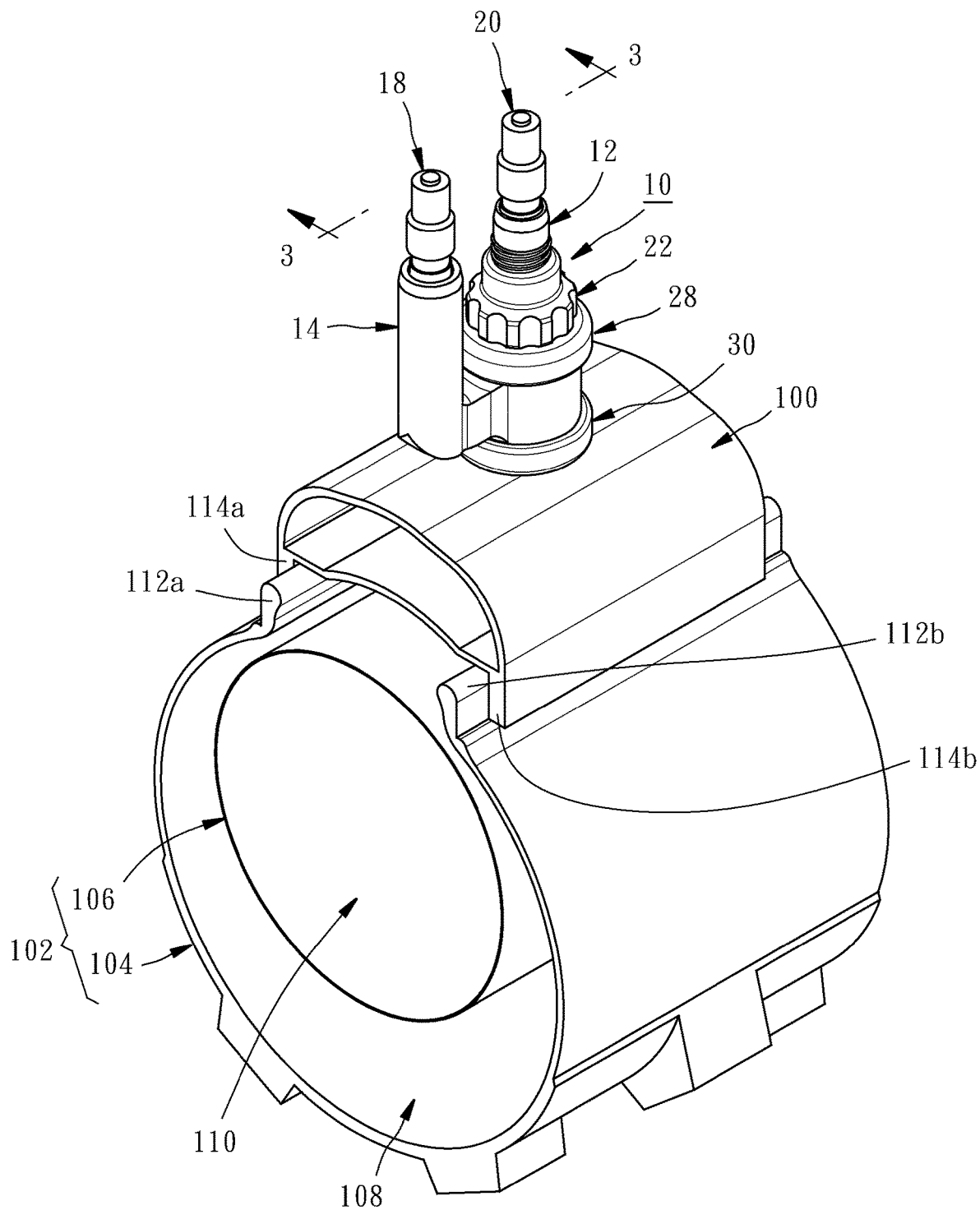
FIG. 1 is partial sectional perspective view of a rim incorporating a tire having an outer member and an inner member, wherein a first embodiment of the valve assembly of the present invention is mounted on the rim.
Figure 2:
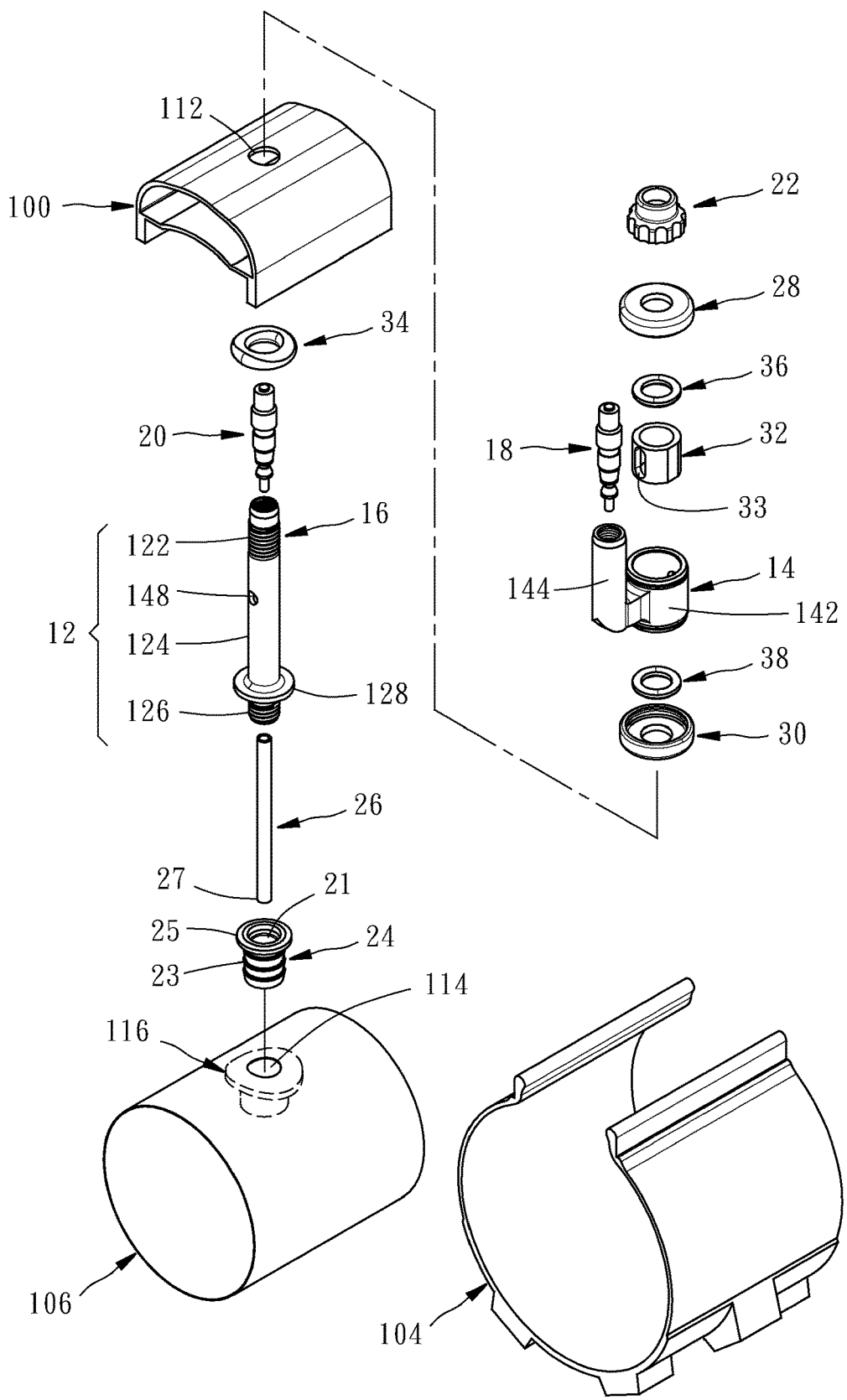
FIG. 2 is an exploded perspective view of the valve assembly incorporating the rim and the tire shown in FIG. 1.

Referring firstly to FIG. 1, it shows a valve assembly 10 configured according to a first embodiment of the present invention. The valve assembly 10 is mounted on a rim 100 incorporating a tire 102 having an outer member 104 and an inner member 106 housed within the outer member 104. The tire 102 further has a first air chamber 108 formed between the outer member 104 and the inner member 106, and a second air chamber 110 formed inside the inner member 106. The outer member 104 usually has flanges 112a and 112b respectively received in the wells 114a and 114b of the rim 100. When the second air chamber 110 is inflated, the inner member 106 may push flanges 112a and 112b of the outer member 104 against the wells 114a and 114b of the rim 100 to seat the outer member 104 against the rim 100.

Referring next to FIGS. 2-7, the valve assembly 10 includes a main body 12, a primary valve body 14, a secondary valve body 16, a primary valve 18, a secondary valve 20, a retaining nut 22, a male barbed end fitting 24, an inner tube 26, an upper end cap 28, a lower end cap 30, a tight-fitting inner spacer 32, an outer seal 34, a first inner seal 36 and a second inner seal 38.

Figure 3:
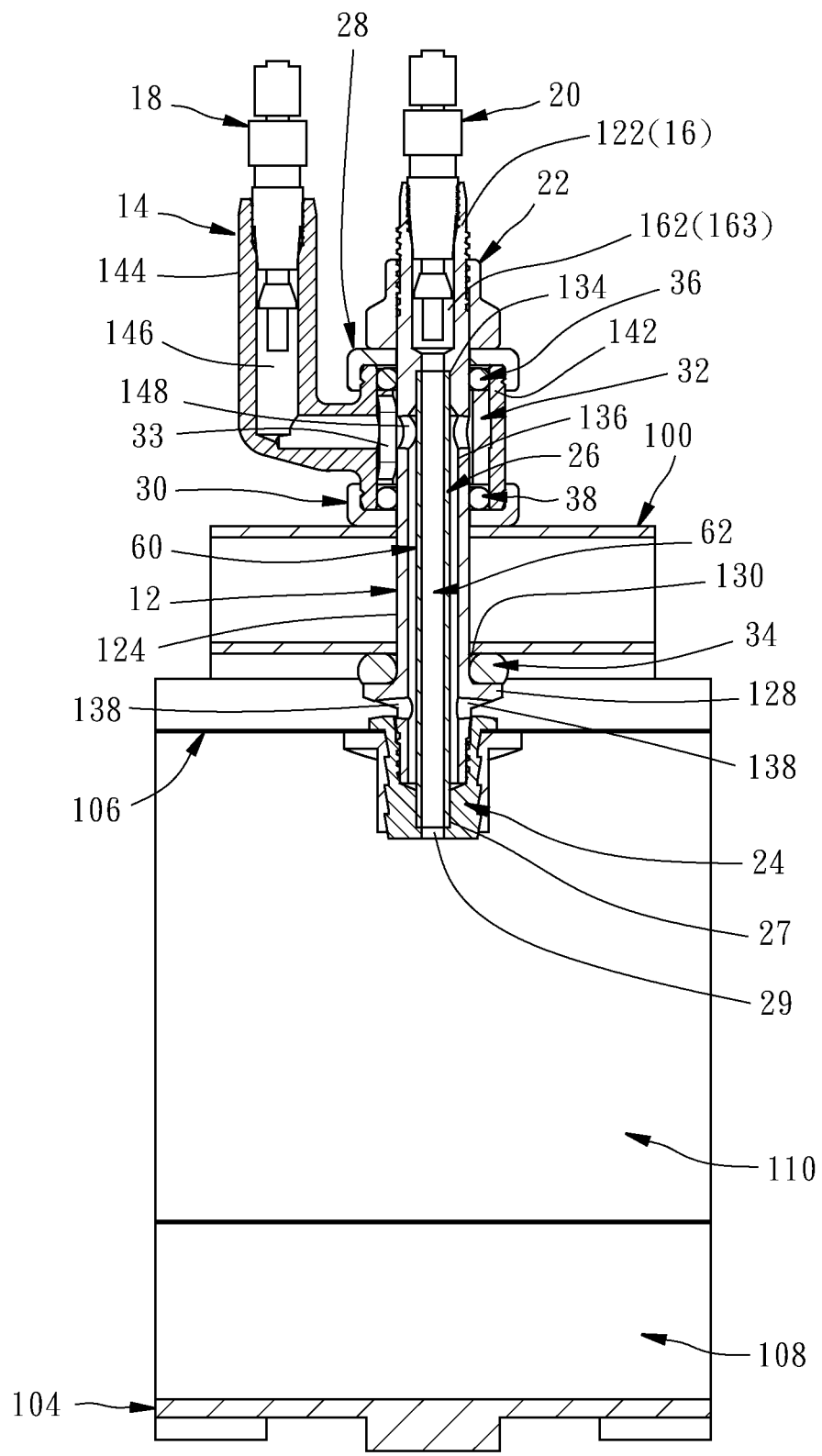
FIG. 3 is a cross section view taken along line 3-3 of FIG. 1.

The main body 12 has an externally-threaded upper portion 122, a middle portion 124 and an externally-threaded lower portion 126. In combination, the externally-threaded upper portion 122 and the middle portion 124 pass through a first opening 112 of the rim 100 and extend outwardly therefrom. The male barbed end fitting 24 has an inner-threaded surface 21, a barbed outer surface 23 and a top flange 25. The male barbed end fitting 24 is engaged with the externally-threaded lower portion 126 by the inner-threaded surface 21 thereof and passes through a second opening 114 in the inner member 106 to be mated to a female fitting 116 fixed on the inner wall of the inner member 106 around the opening 114 by the barbed outer surface 23 thereof and is stopped on the outer wall of the inner member 106 by the top flange 25 thereof such that the externally-threaded lower portion 126 of the main body 12 is secured on the inner member 106. The externally-threaded lower portion 126 of the main body 12 further has a first annular shoulder 128 such that when the externally-threaded lower portion 126 is secured on the inner member 106, an annular groove 130 is formed between the first annular shoulder 128 and an inner wall of the rim 100, as shown in FIG. 3, to receive the outer seal 34 to prevent air from escaping around the stem body 12. At the same time, the first annular shoulder 128 serves as a stop for the main body 12 inside the rim 100.

Figure 4:
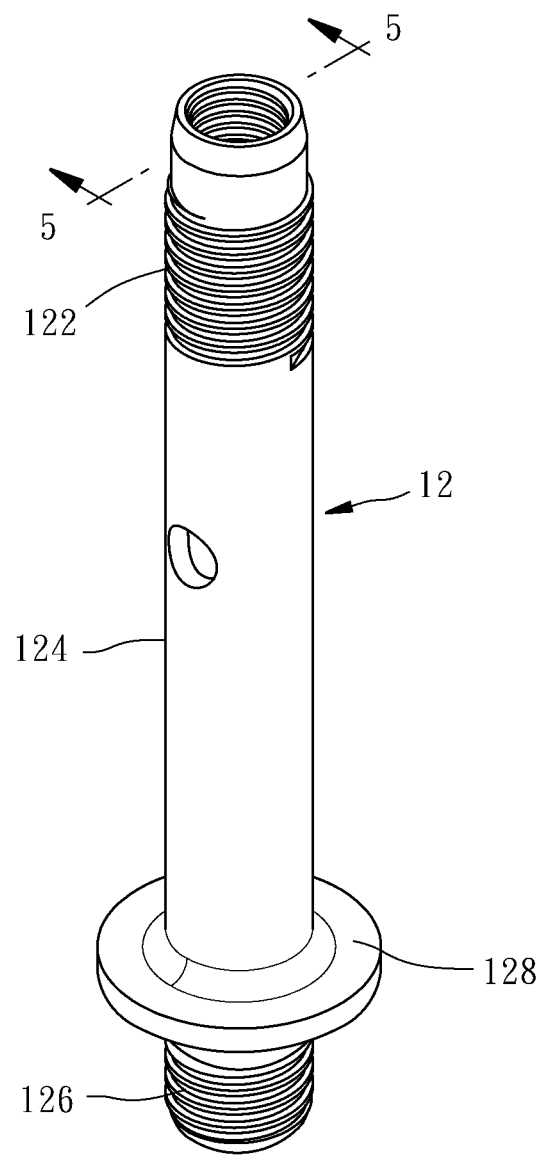
FIG. 4 is a perspective view of the main body of the valve assembly shown in FIG. 1.
Figure 5:
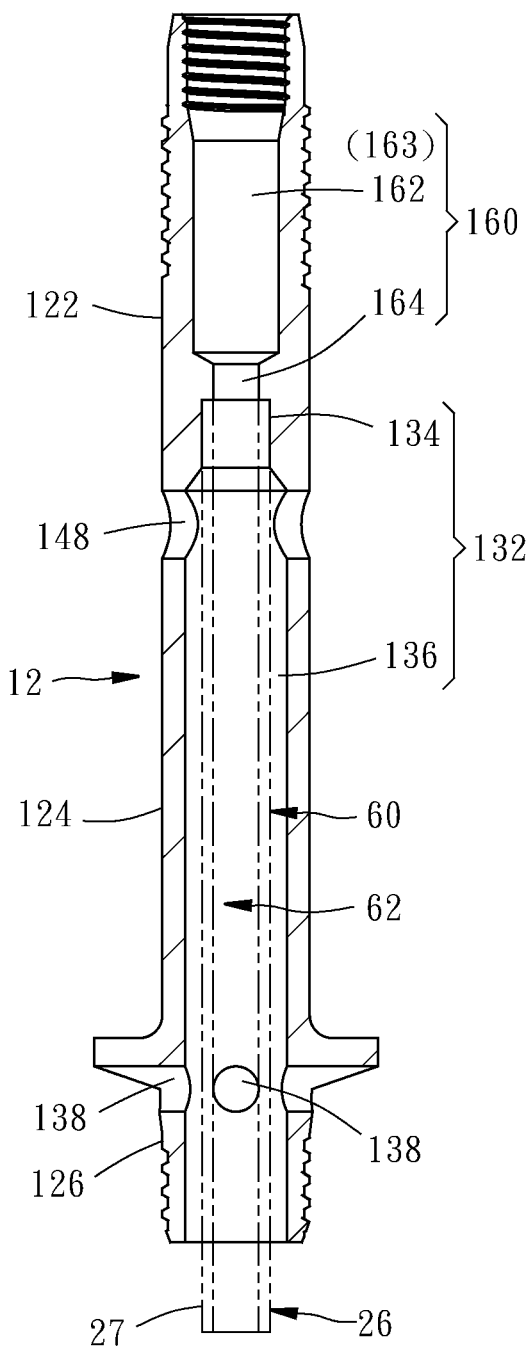
FIG. 5 is a cross section view taken along line 5-5 of FIG. 4.

The main body 12, in particular, as shown in FIGS. 4 and 5, further has a first stepped vent conduit 132 including a smaller inner diameter section 134 and a larger inner diameter section 136. The inner tube 26 has an outer diameter being smaller than the inner diameter of the larger inner diameter section 136 but slightly larger than the inner diameter of the smaller inner diameter section 134 such that the top portion of the inner tube 26 is fitted tightly into the smaller inner diameter section 134 and the other portion of the inner tube 26 extends downwardly to define a first transfer air passage 60 between the inner wall of the main body 12 and the inner tube 26 and the bore of the inner tube 26 is served as a second transfer air passage 62. In this embodiment, the male barbed end fitting 24 further has a second vent conduit 29 connected to the second air chamber 110 such that the end portion of the inner tube 26 is fitted into the second vent conduit 29 of the male barbed end fitting 24. The main body 12 further has a plurality of first cross vent holes 138 disposed on the lower portion 126 thereof to connect the first transfer air passage 60 and the first air chamber 108 to allow air to pass through the first transfer air passage 60 and then into the first air chamber 108.

Figure 6:
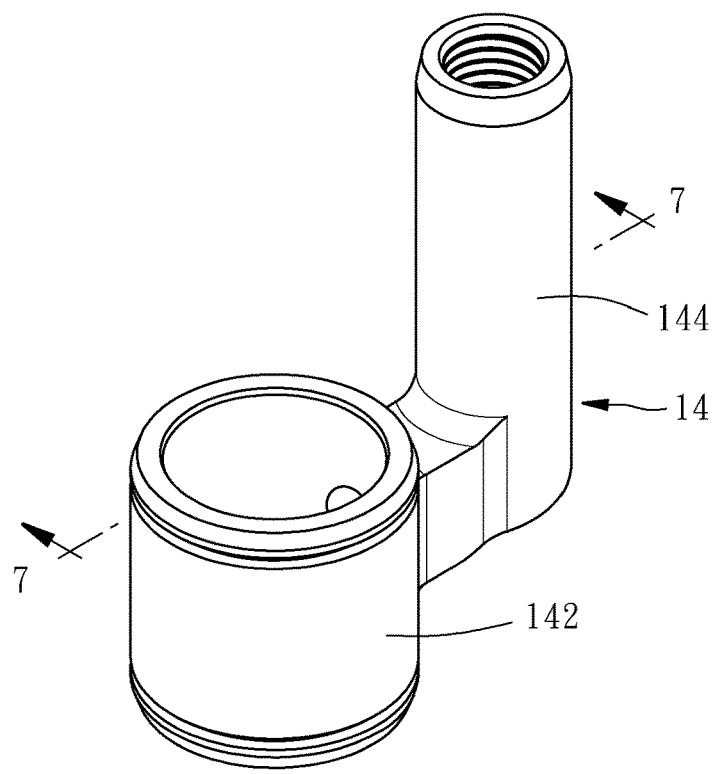
FIG. 6 is a perspective view of the primary valve body of the valve assembly shown in FIG. 1.
Figure 7:
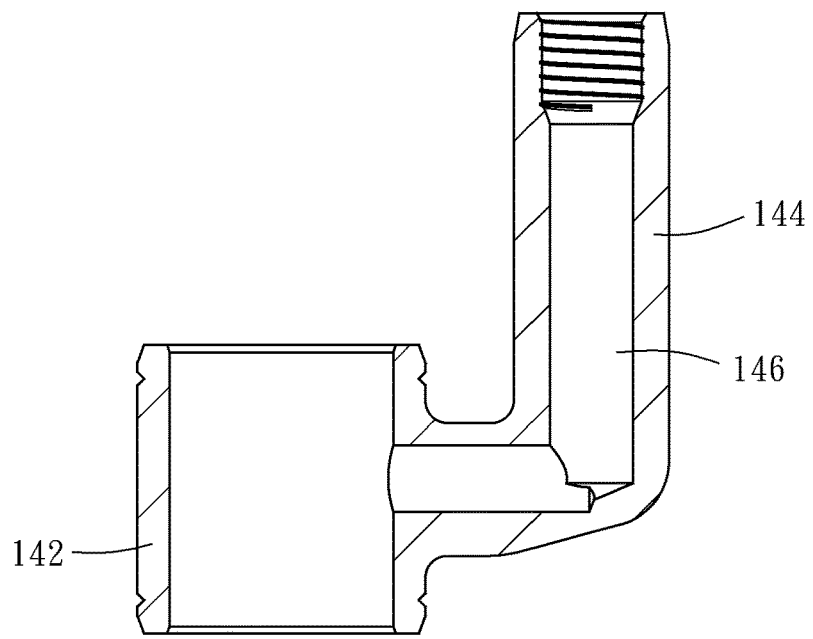
FIG. 7 is a cross section view taken along line 7-7 of FIG. 6.

The primary valve body 14, in particular, as shown in FIGS. 6 and 7, has a first collar portion 142 fitting to the middle portion 124 of the main body 12 and a side branch 144 extending outwardly and upwardly from the first collar portion 142 to which the primary valve 18 is attached. The upper end cap 28 is disposed on the upper end of the collar portion 142 and the lower end cap 30 is disposed on the lower end of the collar portion 142 and rests against the rim 100. In this embodiment, the retaining nut 22 is threadingly engaged with the externally-threaded upper portion 122 of the main body 12 and rests against the upper end cap 30 to draw the main body 12 and the first collar portion 142 against the rim 100. The tight-fitting inner spacer 32 is nested tightly between the inner surface of the collar portion 142 of the primary valve body 14 and the outer surface of the middle portion 124 of the main body 12. The first inner seal 36 and the second inner seal 38 are constrained between the inner wall of the collar portion 142 and the middle portion 124 of the main body 12 to prevent air from escaping around the main body 12.

The side branch 144 of the primary valve body 14 has a primary inlet air passage 146 connected to the first transfer air passage 60 by a second cross vent hole 148 of the middle portion 124 of the main body 12 and a third cross vent hole 33 of the tight-fitting inner spacer 32. Thus, air applied to the primary valve 18 is constrained to pass through the primary inlet air passage 146 and transfer into the first transfer air passage 60 then out through the first cross vent holes 138 into the first air chamber 108.

In this embodiment, the main body 12 and the secondary valve body 16 are formed as a single piece. In more detail, the externally-threaded upper portion 122 of the main body 12 has, as shown in FIG. 5, a third vent conduit 160 with a larger inner diameter section 162 and a smaller inner diameter section 164 such that the upper externally-threaded portion 122 can serve as the secondary valve body 16. The larger inner diameter section 162 of the third conduit 160 is connected to the second transfer air passage 62 through the smaller inner diameter section 164 to serve as the secondary inlet air passage 163 and the secondary valve 20 is attached thereto. Thus, air applied to the secondary valve 20 is constrained to pass through the secondary air passage 163 and transfer into the second transfer air passage 62 then out through the second vent conduit 29 into the second air chamber 110.

Figure 8:
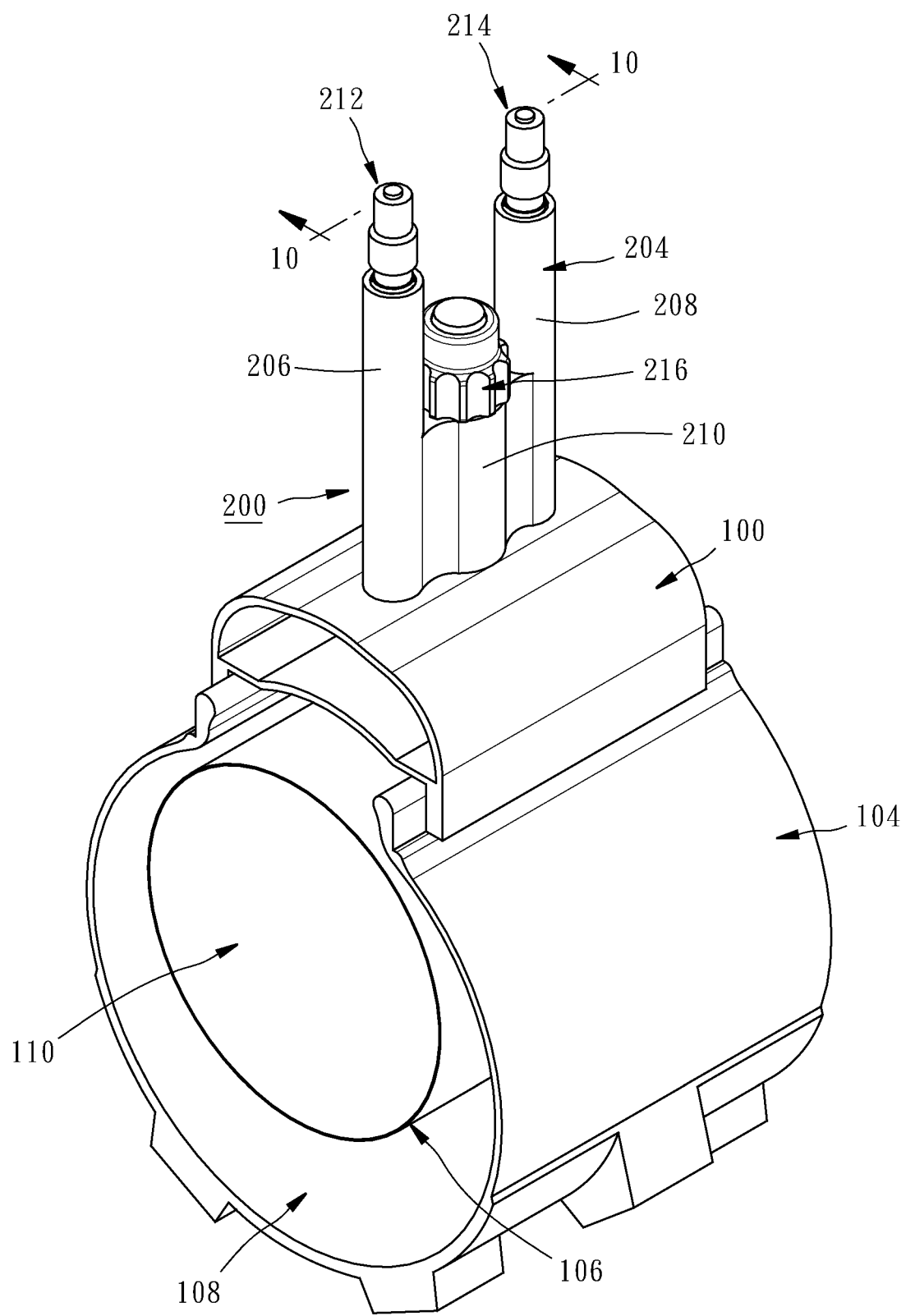
FIG. 8 is partial sectional perspective view of a rim incorporating a tire having an outer member and an inner member, wherein a second embodiment of the valve assembly of the present invention is mounted on the rim.
Figure 9:
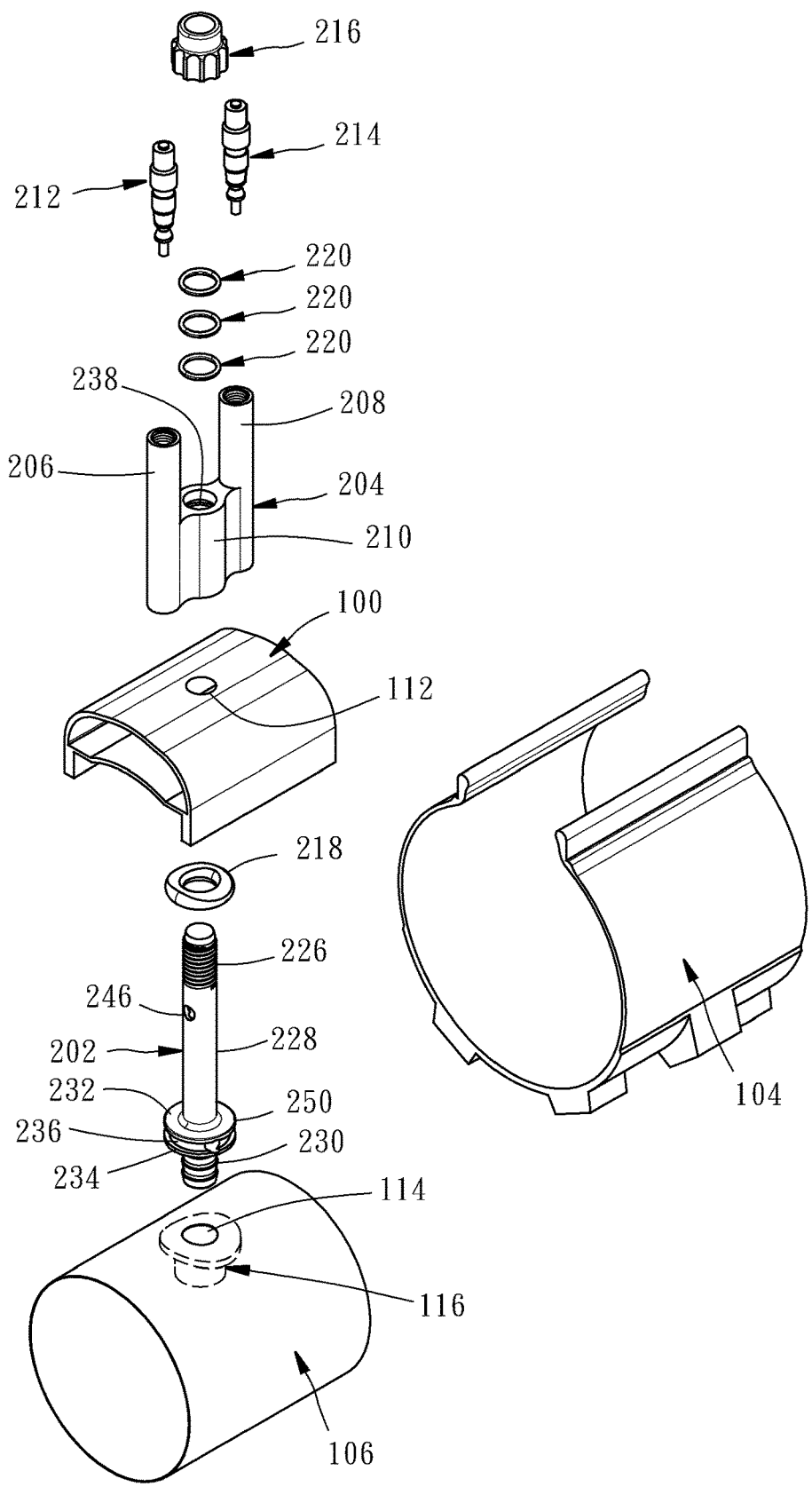
FIG. 9 is an exploded perspective view of the valve assembly incorporating the rim and the tire shown in FIG. 8.
Figure 10:
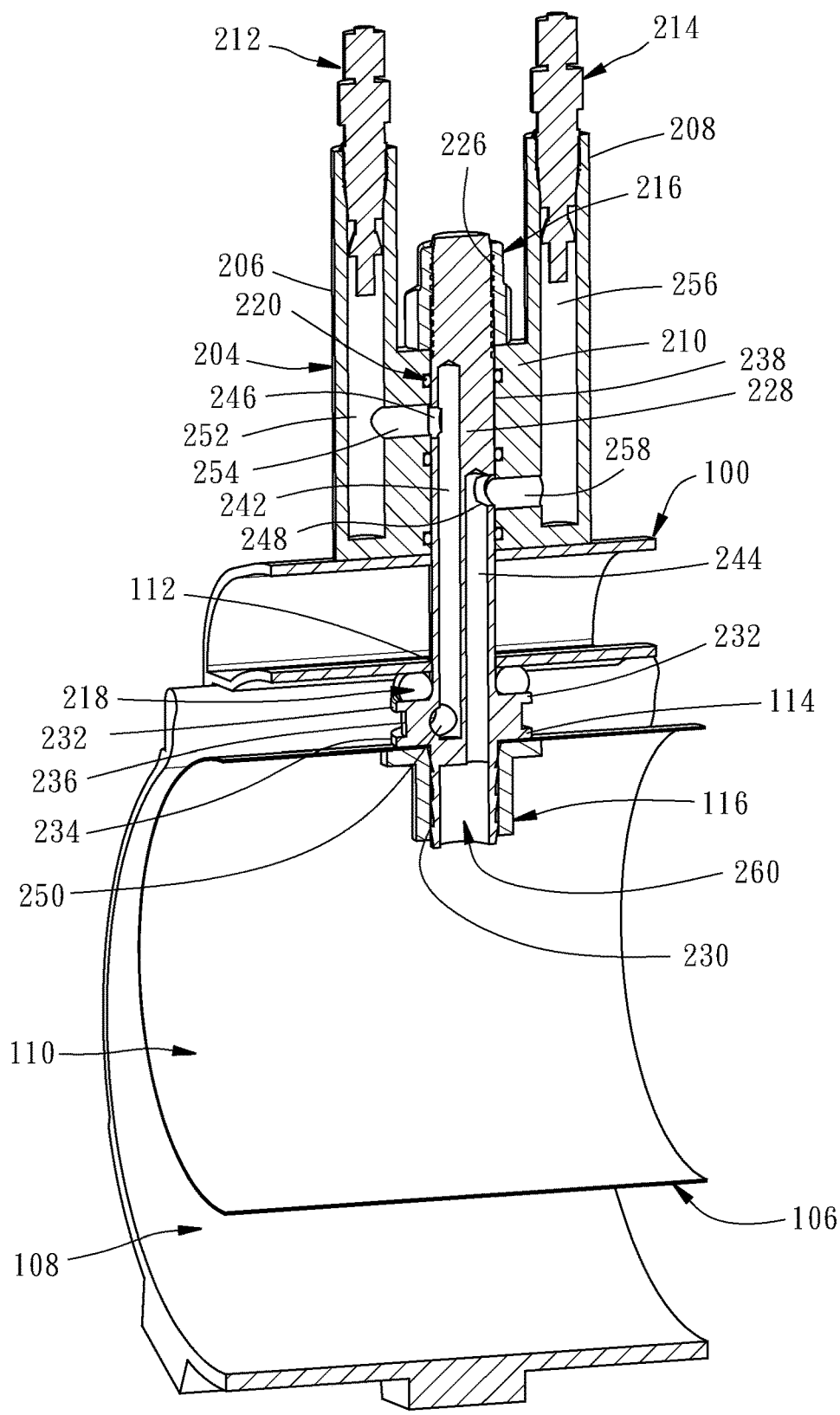
FIG. 10 is a cross section view taken along line 10-10 of FIG. 8.

Referring then to FIGS. 8 to 10, which show a valve assembly 200 configured according to a second embodiment of the present invention. The valve assembly 200 includes a main body 202, a base body 204 having a primary valve portion 206, a secondary valve portion 208 and a connecting portion 210 connecting the primary valve portion 206 and the secondary valve portion 208, a primary valve 212, a secondary valve 214, a retaining nut 216, an outer seal 218, and three inner seals 220.

The main body 202 has an externally-threaded upper portion 226, a middle portion 228 and a male barbed lower portion 230. In combination, the externally-threaded upper portion 226 and the middle portion 228 pass through the first opening 112 of the rim 100 and extend outwardly therefrom and the male barbed lower portion 230 inserts into the inner member 106 through the second opening 114 thereof to mate to the female fitting 116 fixed on the inner side of the inner member 106 around the second opening 114 such that the main body 202 is secured on the inner member 106. In this embodiment, the main body 202 further has a first annular shoulder 232, a second annular shoulder 234 and an annular groove 236 defined therebetween. The outer seal 218 is nested tightly between the first annular shoulder 232 and the inner wall of the rim 100 around the first opening 112 to prevent air from escaping around the stem body 202.

The connecting portion 210 of the base body 204 has a through bore 238 for being passed through by the main body 202 in such a way that the middle portion 228 thereof is housed in the through bore 238 and sealed with three inner seals 220 and the upper externally-threaded portion 226 of the main body 202 extends from the through bore 238 so that the retaining nut 216 is threadingly engaged with the upper externally-threaded portion 226 and rested on the top side of the connecting portion 210 of the base body 204 to draw the main body 202 and the base body 204 against the rim 100.

The main body 202 further has a first transfer air passage 242, a second transfer air passage 244, a first cross vent hole 246, a second cross vent hole 248 and a third cross vent hole 250.

The primary valve portion 206 has a primary inlet air passage 252 to serve as a primary valve body to which the primary valve 212 is attached and a first cross conduit 254 connected to the first cross vent hole 246 and the primary inlet air passage 252. The third cross vent hole 250 of the main body 202 connects to the first transfer air passage 242 and the first air chamber 108. Thus, air applied to the primary valve 212 is constrained to pass through the primary inlet air passage 252 and transfer into the first transfer air passage 242 then out through the third cross vent hole 250 into the first air chamber 108.

The secondary valve portion 208 has a secondary inlet air passage 256 to serve as a secondary valve body to which the primary valve 214 is attached and a second cross conduit 258 connected to the second cross vent hole 248 and the secondary inlet air passage 256. In this embodiment, the male barbed lower portion 230 of the main body 202 has a straight vent conduit 260 connected to the second transfer air passage 244 and the second air chamber 110. Thus, air applied to the secondary valve 214 is constrained to pass through the secondary inlet air passage 256 and transfer into the second transfer air passage 244 then out through the straight vent conduit 260 into the second air chamber 110.

Figure 11:
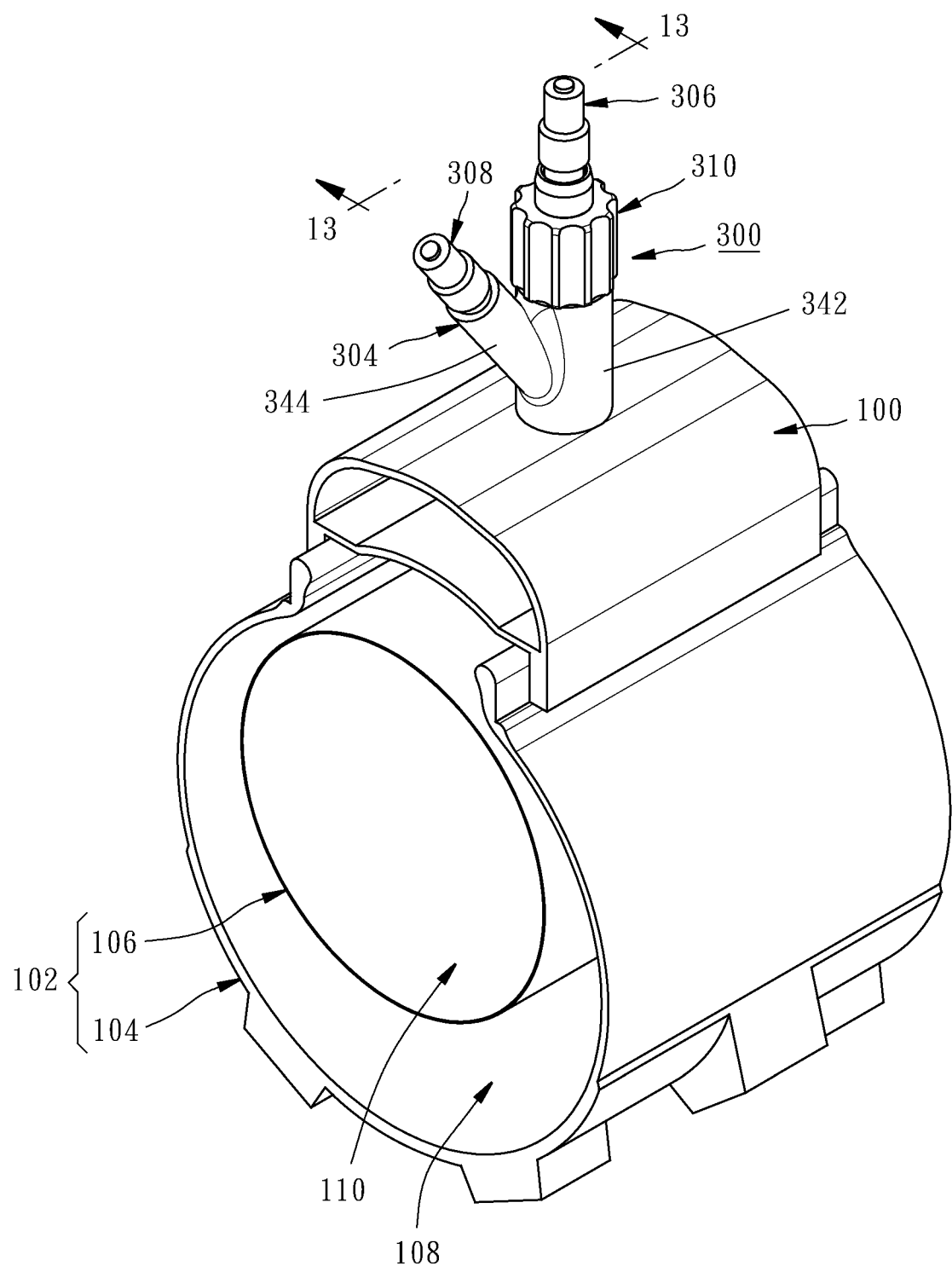
FIG. 11 is partial sectional perspective view of a rim incorporating a tire having an outer member and an inner member, wherein a third embodiment of the valve assembly of the present invention is mounted on the rim.
Figure 12:
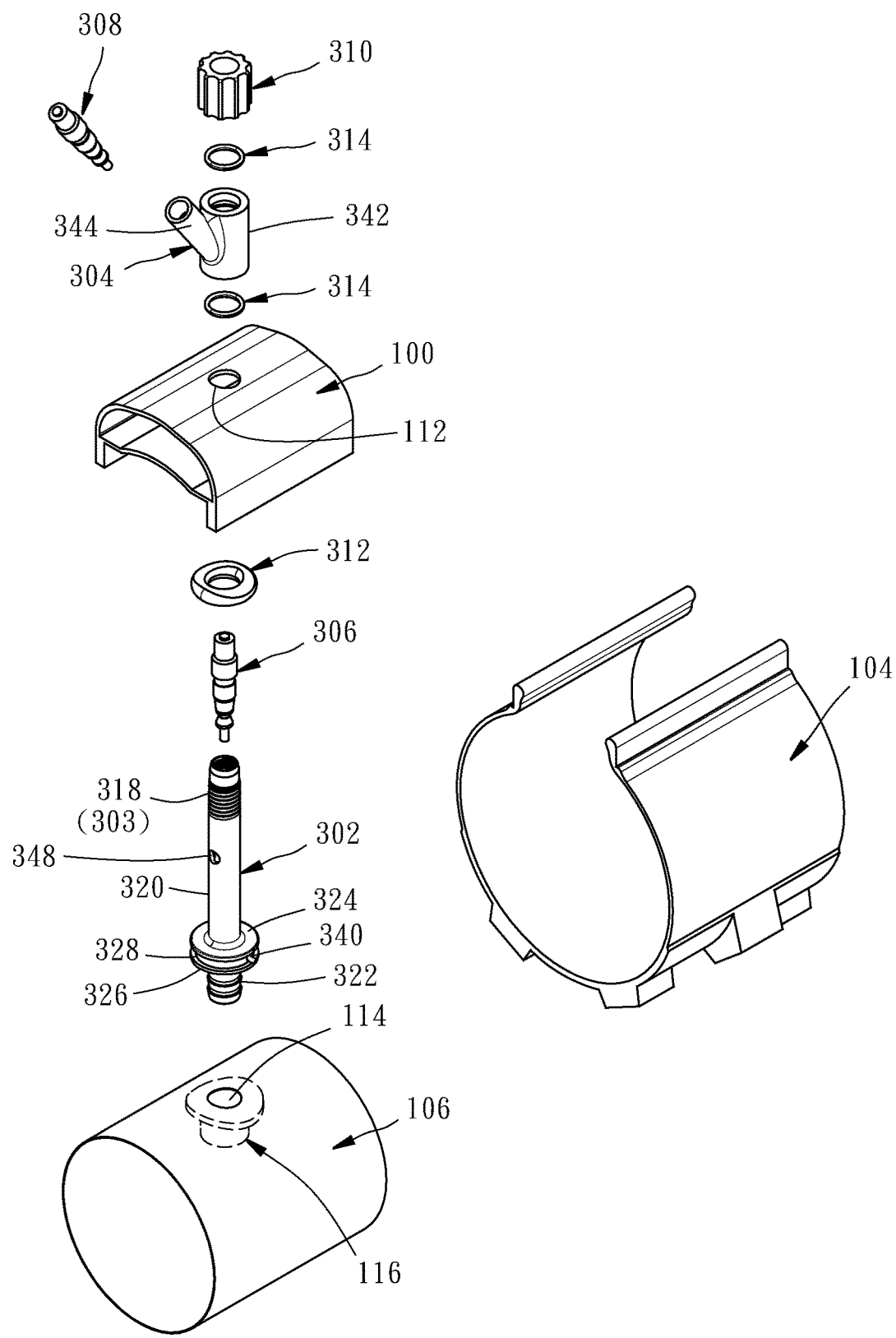
FIG. 12 is an exploded perspective view of the valve assembly incorporating the rim and the tire shown in FIG. 11.
Figure 13:
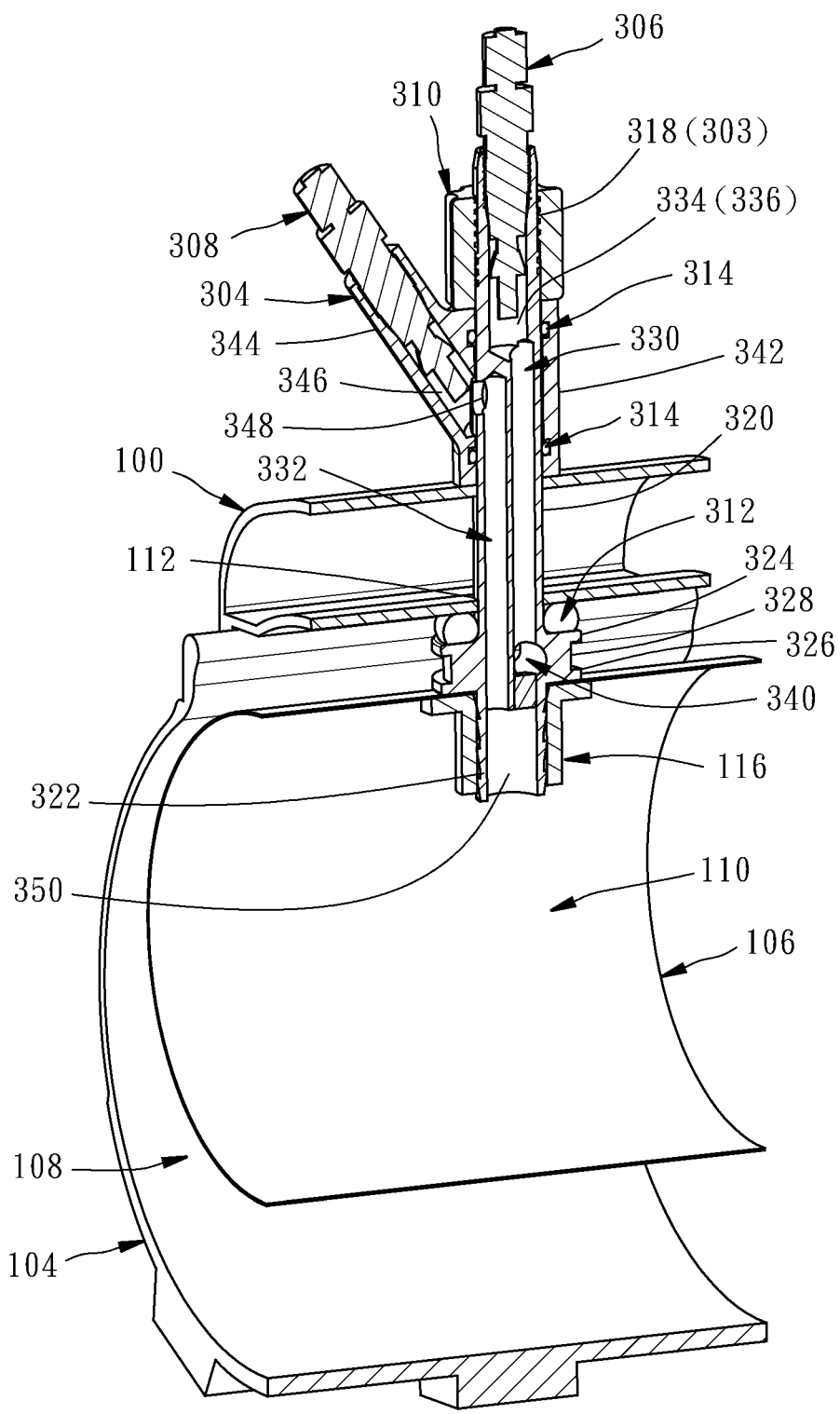
FIG. 13 is a cross section view taken along line 13-13 of FIG. 11.

Referring lastly to FIGS. 11 to 13, which show a valve assembly 300 configured according to a third embodiment of the present invention. The valve assembly 300 is secured on the rim 100 and includes a main body 302, a primary valve body 303, a secondary valve body 304, a primary valve 306, a secondary valve 308, a retaining nut 310, an outer seal 312, and two inner seals 314.

The main body 302, which is shaped as a stem, has an externally-threaded upper portion 318, a middle portion 320 and a male barbed lower portion 322. The externally-threaded upper portion 318 and the middle portion 320 pass through the opening 112 of the rim 100 and extend outwardly therefrom. The male barbed lower portion 322 inserts into the inner member 106 through the second opening 114 thereof to mate to the female fitting 116 fixed on the inner wall of the inner member 106 around the second opening 114 such that the main body 302 is secured on the inner member 106.

In this embodiment, the main body 302 further has a first annular shoulder 324, a second annular shoulder 326 and an annular groove 328 is defined therebetween. The outer seal 312, as shown in FIG. 13, is received between the first annular shoulder 324 and the inner wall of the rim 100 around the first opening 112 to prevent air from escaping around the main body 302. The second annular shoulder 326 is rested on the outer wall of the inner member 106

The middle portion 320 of the main body 302 has a first transfer air passage 330 and a second transfer air passage 332. In this embodiment, the main body 302 and the primary valve body 303 are also formed as a single piece. In other words, the externally-threaded upper portion 318 of the main body 302 serves as the primary valve body 303. The externally-threaded upper portion 318 has an upper vent conduit 334 connected to the first transfer air passage 330 to serve as a primary inlet air passage 336. The primary valve 306 is attached to the outlet of the upper vent conduit 334. The main body 302 further has a lower cross vent hole 340 connected to the first transfer air passage 330 and the first air chamber 108. Thus, air applied to the primary valve 306 is constrained to pass through the primary inlet air passage 336 and transfer into the first transfer air passage 330 then out through the lower cross vent hole 340 into the first air chamber 108.

The secondary valve body 304 has a second collar portion 342 and a second side branch 344 oriented at an oblique angle with respect to the second collar portion 342. The second collar portion 342 fits to the middle portion 320 of the main body 302 and is sealed by the inner seals 314. The retaining nut 310 is threadingly engaged with the externally-threaded upper portion 318 of the main body 302 and rests against the top end of the collar portion 342 to draw the secondary valve body 304 against the rim 100 and the first annular shoulder 324 toward the inside of the rim 100 and the outer seal 312.

The side branch 344 of the secondary valve body 304 has a secondary inlet air passage 346 connected to the second transfer air passage 332 by an upper cross vent hole 348 disposed on the wall of the middle portion 320 of the main body 302. The secondary valve 308 is attached to the outlet of the secondary inlet air passage 346. In this embodiment, the male barbed lower portion 322 of the main body 302 has a straight vent conduit 350 connected to the second transfer air passage 332 and the second air chamber 110. Thus, air applied to the secondary valve 308 is constrained to pass through the secondary inlet air passage 346 and transfer into the second transfer air passage 332 then out through the straight vent conduit 350 into the second air chamber 110.

What is claimed is:

1. A valve assembly for a tire, the tire having at least two air chambers and mounted on a rim with a single hole, the valve assembly comprising:
a main body positioned on the single hole of the rim and including at least two transfer air passages respectively connected to each of the air chambers;
at least two valve bodies respectively disposed on the main body, each of the at least two valve bodies having an inlet air passage connected to one of the at least two transfer air passages of the main body;
a securing means for securing the main body and the at least two valve bodies on the rim and the tire; and
at least two valves respectively attached to each of the at least two valve bodies.

2. The valve assembly for a tire as claimed in claim 1, wherein the main body has an externally-threaded upper portion, a middle portion and an externally-threaded lower portion; a primary one of the at least two valve bodies disposed on the middle portion in such a way that the inlet air passage thereof served as a primary inlet air passage is connected to a first one of the at least two transfer air passages, a secondary one of the at least two valve bodies disposed on the externally-threaded upper portion in such a way that the inlet air passage thereof served as a secondary inlet air passage is connected to a second one of the at least two transfer air passages.

3. The valve assembly for a tire as claimed in claim 2, wherein the main body and the secondary one of the at least two valve bodies are formed as a single piece.

4. The valve assembly for a tire as claimed in claim 2, wherein the securing means has a male barbed end fitting threadingly engaged with the externally-threaded lower portion, a female fitting disposed on an inner wall of the tire such that the male barbed end fitting is mated to the female fitting to fix the main body on the tire, and a retaining nut threadingly engaging the externally-threaded upper portion of the main body to draw the main body and the at least two valve bodies against the rim.

5. The valve assembly for a tire as claimed in claim 4, further comprising an outer seal, the externally-threaded lower portion of the main body having a first annular shoulder to sit the outer seal thereon to seal against an inner wall of the rim.

6. The valve assembly for a tire as claimed in claim 4, wherein the middle portion of the main body has a first vent conduit and an inner tube with a through bore being arranged in the first vent conduit in such a way that an annular space is defined between the inside wall of the middle portion of the main body and the outside wall of the inner tube to serve as the first transfer air passage, and the through bore of the inner tube is served as the second transfer air passage.

7. The valve assembly for a tire as claimed in claim 6, wherein the main body has a first cross vent hole connected to the primary inlet air passage and the first transfer air passage, and a second cross vent hole connected to the first transfer air passage and a first one of the at least two air chambers.

8. The valve assembly for a tire as claimed in claim 7, wherein the male barbed end fitting has a second vent conduit connected to a second one of the at least two air chambers.

9. The valve assembly for a tire as claimed in claim 8, wherein the inner tube has an end section fitted into the second vent conduit of the male barbed end fitting.

10. The valve assembly for a tire as claimed in claim 7, wherein the primary valve body includes a collar portion fitted to the middle portion of the main body and a side branch extending outwardly and upwardly from the collar portion to which the primary valve is attached.

11. The valve assembly for a tire as claimed in claim 10, wherein the primary valve body further includes an upper end cap disposed on an upper end of the collar portion, a lower end cap disposed on a lower end of the collar portion.

12. The valve assembly for a tire as claimed in claim 11, wherein the primary valve body further includes a tight-fitting inner spacer disposed between an inner surface of the collar portion and an outer surface of the middle portion of the main body and having a third cross vent hole connected to the primary inlet air passage and the first cross vent hole.

13. The valve assembly for a tire as claimed in claim 12, wherein the retaining nut is rested on the upper end cap and the lower end cap is rested on the rim.

14. The valve assembly for a tire as claimed in claim 13, further comprising a first inner seal constrained between the middle portion of the main body and the inner wall of the primary valve portion.

15. The valve assembly for a tire as claimed in claim 1, wherein the main body has an externally-threaded upper portion, a middle portion and a male barbed lower portion; the valve assembly comprises a base body having a primary portion served as a primary valve body of the at least two valve bodies, a secondary portion served as a secondary valve body of the at least two valve bodies, and a connecting portion connecting the primary portion and the secondary portion, the primary portion having a primary inlet air passage, the secondary portion having a secondary inlet air passage, the connecting portion having a through bore for being passed through by the main body in such a way that the middle portion thereof is housed in the through bore and the upper externally-threaded portion of the main body extends from the through bore.

16. The valve assembly for a tire as claimed in claim 15, wherein the securing means has a female fitting disposed on an inner wall of the tire such that the male barbed lower portion of the main body is mated to the female fitting to fix the main body on the tire, and a retaining nut threadingly engaging the externally-threaded upper portion of the main body and resting on the an upper side of the connecting portion of the base body to draw the main body and the base body against the rim.

17. The valve assembly for a tire as claimed in claim 16, further comprising an outer seal, the male barbed lower portion of the main body having a first annular shoulder sitting the outer seal thereon and sealing against an inner wall of the rim.

18. The valve assembly for a tire as claimed in claim 17, wherein the main body has a first cross vent hole and a second cross vent hole, the connecting portion of the base body has a first vent conduit connected to the primary air passage and the first cross vent hole, and a second vent conduit connected to the secondary air passage and the second cross vent hole.

19. The valve assembly for a tire as claimed in claim 18, wherein the main body further has a third cross vent hole connected to the first transfer air passage and the first one of the at least two air chambers.

20. The valve assembly for a tire as claimed in claim 19, wherein the male barbed lower portion of the main body has a straight vent conduit connected to the second transfer air passage and the second one of the at least two air chambers.

21. The valve assembly for a tire as claimed in claim 1, wherein the main body has an externally-threaded upper portion, a middle portion and a male barbed fitting lower portion; a primary one of the at least valve bodies disposed on the externally-threaded upper portion in such a way that the inlet air passage thereof served as a primary inlet air passage is connected to a first one of the at least transfer air passages, a secondary one of the at least valve bodies has a collar portion fitted by the middle portion of the main body and a side branch oriented at an oblique angle with respect to the collar portion in such a way that the inlet air passage thereof served as a secondary inlet air passage is connected to a second one of the at least transfer air passages.

22. The valve assembly for a tire as claimed in claim 21, wherein the main body and the primary one of the at least two valve bodies are formed as a single piece.

23. The valve assembly for a tire as claimed in claim 21, wherein the securing means has a female fitting disposed on an inner wall of the tire such that the male barbed fitting lower portion of the main body is mated to the female fitting to secure the main body on the rim, and a retaining nut threadingly engaging the externally-threaded upper portion of the main body and rested on the upper side of the collar portion of the secondary one of the at least valve bodies to draw the main body and the secondary one of the at least valve bodies against the rim.

24. The valve assembly for a tire as claimed in claim 23, further comprising an outer seal, the male barbed fitting lower portion of the main body having a first annular shoulder to sit the outer seal between the first annular shoulder and the inner wall of the rim to prevent air from escaping around the main body.

25. The valve assembly for a tire as claimed in claim 23, wherein the main body has a lower cross vent hole connected to the first one of the at least two transfer air passages and the first one of the at least two air chambers, and an upper cross vent hole connected to the secondary inlet air passage and the second one of the at least two transfer air passages.

26. The valve assembly for a tire as claimed in claim 25, wherein the male barbed fitting lower portion of the main body has a straight vent conduit connected to the second one of the at least two transfer air passages and the second one of the at least two air chambers.

* * * * *